United States Patent
Page et al.

[11] Patent Number: 6,040,358
[45] Date of Patent: Mar. 21, 2000

[54] INK JET INKS CONTAINING LINEAR POLYMER ADDITIVES

[75] Inventors: Loretta Ann Grezzo Page, Newark; Harry Joseph Spinelli; Waifong Liew Anton, both of Wilmington, all of Del.

[73] Assignee: E. I. du Pont de Nemours and Company, Wilmington, Del.

[21] Appl. No.: 08/774,991

[22] Filed: Dec. 27, 1996

[51] Int. Cl.⁷ .................................................. C09D 11/10
[52] U.S. Cl. .......................... 523/161; 524/501; 524/505; 260/DIG. 38
[58] Field of Search ........................ 523/161; 106/20 D; 260/DIG. 38; 524/501, 505

[56] References Cited

U.S. PATENT DOCUMENTS

| | | | |
|---|---|---|---|
| 4,337,183 | 6/1982 | Santiago | 524/446 |
| 4,365,035 | 12/1982 | Zabiak | 524/283 |
| 4,597,794 | 7/1986 | Ohta et al. | 106/20 C |
| 4,704,309 | 11/1987 | Coney et al. | 427/258 |
| 4,963,652 | 10/1990 | Tortorici et al. | 524/604 |
| 5,085,698 | 2/1992 | Ma et al. | 106/20 D |
| 5,106,417 | 4/1992 | Hauser et al. | 106/20 D |
| 5,160,370 | 11/1992 | Suga et al. | 106/19 R |
| 5,169,881 | 12/1992 | Peters et al. | 523/319 |
| 5,172,133 | 12/1992 | Suga et al. | 347/100 |
| 5,207,825 | 5/1993 | Schwarz, Jr. | 106/22 R |
| 5,218,032 | 6/1993 | Sharma | 524/379 |
| 5,274,025 | 12/1993 | Stockl et al. | 524/513 |

FOREIGN PATENT DOCUMENTS

| | | | |
|---|---|---|---|
| 0 429 928 A1 | 6/1991 | European Pat. Off. | C09D 11/00 |
| 60-45667 | 10/1985 | Japan | C09D 11/00 |
| 2-103274 | 4/1990 | Japan | C09D 11/00 |
| 5-62633 | 9/1993 | Japan | C09D 11/16 |
| 2 031 469 | 4/1990 | United Kingdom | D06P 1/44 |

*Primary Examiner*—Marion E. McCamish
*Assistant Examiner*—John J. Guarriello
*Attorney, Agent, or Firm*—Joseph A. Tessari

[57] ABSTRACT

Inks for ink jet printers contain an aqueous carrier medium; a colorant that is insoluble in the aqueous carrier, a polymer dispersant; and a linear polymer additive selected from the group consisting of an water soluble, elastomeric ABA block polymer comprising an elastomeric B block and non-elastomeric A blocks; anionic polymers selected from neutralized acrylic and methacrylic acid polymers; cationic polymers selected from neutralized or quaternized amine polymers; water-dispersible β-diketone containing polymers and ethylene oxide containing polymers.

7 Claims, No Drawings

INK JET INKS CONTAINING LINEAR POLYMER ADDITIVES

BACKGROUND OF THE INVENTION

This invention relates to aqueous inks for ink jet printers, and more particularly, to aqueous ink jet inks containing a linear polymer as an additive to improve smear resistance, increase color gamut and reduce bleed of the applied ink.

Ink jet printing is a non-impact printing process in which droplets of ink are deposited on a substrate such as paper or transparency film in response to an electronic signal. Low cost and high quality of the output, combined with relatively noise free operation, have made ink jet printers a popular option to other types of printers used with computers.

Both dyes and pigments have be en used as ink colorants for ink jet printers. The dye-based inks while in general superior in color properties have several disadvantages as compared to pigment based inks. The dyes are usually water soluble and remain so after drying on the substrate. They are easily redissolved by water spills, and the image smears on contact with felt pen markers. In addition, the dyes exhibit poor light stability relative to pigments and are known to fade even under office lighting. Thus, dye-based inks are often unsuitable for use in applications requiring moisture resistance and greater light stability. The pigments are preferred colorants provided the pigment dispersion can be made resistant to flocculation and settling.

Water-based pigment dispersions are well known in the art, and have been used commercially for applying films, such as paints, to various substrates. The pigment dispersion is generally stabilized by either a non-ionic or ionic technique. When using the non-ionic technique, the pigment particles are stabilized by a polymer that has a water-soluble, hydrophilic section that extends into the water and provides entropic or steric stabilization. Representative polymers useful for this purpose include polyvinyl alcohol, cellulosics, ethylene oxide modified phenols, and ethylene oxide/propylene oxide polymers. While the non-ionic technique is not sensitive to pH changes or ionic contamination, it has a major disadvantage for many applications in that the final product is water sensitive. Thus, if used in ink applications or the like, the pigment will tend to smear upon exposure to moisture, and mechanical action such as handling. "Highlighting" text with a felt-tip pen which contains translucent ink is particularly damaging to the image, since the solvents in the highlighting ink smear the text, and the mechanical action smudges the print. Also, pigmented ink systems tend to have low chroma versus dye-based ink systems, and are prone to poor pen performance due to ink crusting on the pen orifices, coating of the pen resistors, etc.

There exists a need for ink jet inks which have good water resistance, smear fastness, higher chroma and good pen performance. In particular, with pigment based inks there is a need to maintain the stability of the dispersion while improving water and smear fastness.

SUMMARY OF THE INVENTION

The present invention provides an ink jet ink comprising:
(a) an aqueous carrier medium;
(b) an aqueous carrier medium insoluble colorant
(c) a polymer dispersant; and
(d) a substantially water soluble linear polymer additive selected from the group consisting of:
  (i) an elastomeric ABA block polymer comprising an elastomeric B block and non-elastomeric A blocks, wherein the B block comprises an elastomeric polymer having a Tg of $<0°$ C. and a degree of polymerization of $>10$, and wherein the A block comprises a non-elastomeric acrylic or methacrylic polymer having a Tg $>10°$ C. and a degree of polymerization of $<20$;
  (ii) anionic polymers selected from the group consisting of neutralized acrylic and methacrylic acid containing polymers;
  (iii) cationic polymers selected from the group consisting of amine containing polymers;
  (iv) $\beta$-diketone containing polymers; and
  (v) ethylene oxide containing polymers.

The inks of the invention are stable, have low viscosity, exhibit excellent print quality, provide excellent smear resistance after drying and good decap or crusting time. They may be used with a variety of ink jet printers such as continuous, piezoelectric, drop-on-demand and thermal or bubble jet drop-on-demand, and are particularly adapted for use in thermal ink jet printers. These inks may also be useful in air brush printing devices.

DETAILED DESCRIPTION OF THE INVENTION

The invention provides an ink jet ink composition which is particularly suited for use in ink jet printers in general, and thermal ink jet printers in particular. The inks comprise an aqueous carrier medium, a colorant that is insoluble in the aqueous medium, a polymeric dispersant, usually a structured polymeric dispersant, and a linear polymer additive. These inks are stable over long periods, both in storage and in the printer. The inks may be adapted to the requirements of a particular ink jet printer to provide a balance of light stability, smear resistance, viscosity, surface tension, high optical density, and crust resistance.

Aqueous Carrier Medium

The aqueous carrier medium is water or a mixture of water and at least one water soluble organic solvent. Selection of a suitable mixture depends on requirements of the specific application, such as desired surface tension and viscosity, the selected colorant, drying time of the ink, and the type of substrate onto which the ink will be printed. Representative water-soluble organic solvents that may be selected are disclosed in U.S. Pat. No. 5,085,698. A mixture of water and a polyhydric alcohol, such as diethylene glycol, is preferred as the aqueous carrier medium.

If a mixture of water and a water-soluble solvent is used, the aqueous carrier medium usually contains from about 30% to about 95% water with the balance (i.e., 70 to 5%) being the water-soluble solvent. Preferably, the aqueous carrier medium is 60–95%, by weight, water. The aqueous carrier medium comprises 70 to 99.8%, by weight of the total ink composition, depending on the type of colorant selected. Preferably, the aqueous carrier medium comprises 94–99.8% when an organic pigment is selected; 70 to 99.8% when an inorganic pigment is selected; and 80 to 99.8% when a dye is selected.

Colorants

The colorant is either a dye or a pigment that is insoluble in the aqueous carrier medium. By the term "dye" we mean a colorant that becomes soluble at some point during the printing process. By "pigment" we mean a colorant that is insoluble (i.e., in particulate or crystalline form) throughout the printing process. Pigments are the preferred colorants for use in the compositions of this invention.

Pigments:

Useful pigments comprise a wide variety of organic and inorganic pigments, alone or in combination. The pigment particles are sufficiently small to permit free flow of the ink through the ink jet printing device, especially at the ejecting nozzles that usually have a diameter ranging from 10 micron to 50 micron. The particle size also has an influence on the pigment dispersion stability, which is critical throughout the life of the ink. Brownian motion of minute particles will help prevent the particles from settling. It is also desirable to use small particles for maximum color strength. The range of useful particle size is approximately 0.005 micron to 15 microns, preferably 0.005 to 5 microns, and most preferably from 0.01 to 0.3 micron.

The selected pigment may be used in dry or wet (i.e., presscake) form. In presscake form, the pigment is not aggregated to the extent that it is in dry form and therefore do not require as much deaggregation in the process of preparing the inks. Representative commercial dry and presscake pigments that may be used in practicing the invention are disclosed in U.S. Pat. No. 5,085,698 issued Feb. 4, 1992.

Fine particles of metal or metal oxides also may be used to practice the invention. For example, metal and metal oxides are suitable for the preparation of magnetic ink jet inks. Fine particle size oxides, such as silica, alumina, titania, and the like, also may be selected. Furthermore, finely divided metal particles, such as copper, iron, steel, aluminum and alloys, may be selected for appropriate applications. In the case of organic pigments, the ink may contain up to approximately 30% pigment by weight, but will generally be in the range of approximately 1 to 15%, preferably approximately 1 to 8%, by weight of the total ink composition for most ink jet printing applications. If an inorganic pigment is selected, the ink will tend to contain higher weight percentages of the pigment than with comparable inks employing organic pigment, and may be as high as approximately 50% because inorganic pigments generally have higher specific gravities than the organic pigments.

Dyes

The color and amount of dye present in the ink composition is largely a function of choice, being primarily dependent upon the desired color of the print achieved with the ink, the purity of the dye and its strength. Low concentrations of dye may not give adequate color vividness whereas high concentrations may result in poor printhead performance or unacceptably dark colors. Generally, the dye will be present in the amount of 0.01 to 20%, preferably 0.05 to 8%, and most preferably 1 to 5%, by weight, based on the total weight of the ink composition.

Dispersant

Polymeric dispersants suitable for practicing the invention include random polymers and structured polymeric dispersants such as block copolymers and branched-type polymers. The polymers may be anionic, cationic, or nonionic in nature.

Random polymers are not as effective in stabilizing colorant dispersions as structured polymers and, therefore, are not preferred. However, a random polymer which has both hydrophilic sections for aqueous solubility and hydrophobic sections for interaction with the colorant and an average molecular weight to contribute to the dispersion stability can be effectively used to practice the present invention. Such polymeric dispersants are disclosed in U.S. Pat. No. 4,597,794.

The block polymers suitable for practicing the invention are AB, BAB and ABC type structures. A block polymer which has hydrophobic and hydrophilic blocks and balanced block sizes to contribute to the dispersion stability may be advantageously used to practice this invention. Functional groups can be built into the hydrophobic (colorant binding) block for stronger specific interactions between the colorant and the polymer dispersant to give an improved dispersion stability. A detailed description of these polymers can be found in the aforementioned U.S. Pat. Nos. 5,085,698 and 5,272,201 and in EPO application 0 556 649 A1, published Aug. 25, 1993.

The amount of the polymer depends on the structure, molecular weight and other properties of the polymer, and on the other components of the ink composition. The dispersant polymers that are selected in practicing the invention have number average molecular weight of below 40,000, preferably below 20,000, and typically in the range of 2,000 to 10,000.

The polymeric dispersant may be present in the amount of 0.1 to 25%, preferably 0.1 to 8% by weight, based on the total weight of the ink composition. If the amount is too high, it will be difficult to maintain the desired ink viscosity. Dispersion stability will be adversely affected if insufficient polymer is present.

Polymer Additive

Suitable linear polymer additives for use in the present invention which are substantially water soluble are those selected from the group consisting of (i) elastomeric ABA block polymers comprising an elastomeric B block and non-elastomeric A blocks, wherein the B block comprises an elastomeric polymer having a Tg of <0° C. and a degree of polymerization of >10, and wherein the A block comprises a non-elastomeric acrylic or methacrylic polymer having a Tg >10° C. and a degree of polymerization of <20;

(ii) anionic polymers selected from the group consisting of acrylic and methacrylic acid containing polymers;

(iii) cationic polymers selected from the group consisting of amine containing polymers;

(iv) β-diketone containing water-dispersible polymers; and (v) ethylene oxide containing polymers.

The polymer additives may be made by a variety of polymerization processes including, but not limited to, free radical solution polymerization, emulsion, suspension, bulk, group transfer polymerization. The molecular weight of the linear polymer additives can be controlled by one skilled in the art using chain transfer agents. The linear polymer additive may be present in the amount of 0.5 to 20% by weight, preferably 1 to 12% by weight, based on the total weight of the ink composition.

Elastomeric ABA Block Polymers

Water-soluble elastomeric ABA block polymers comprised of an elastomeric B block and non-elastomeric A blocks, wherein the B block comprises an elastomeric polymer having a Tg of <0° C., preferable −50 to −80° C., and a degree of polymerization of >10, preferable >20, and more preferable >40. Suitable monomers for preparing these elastomeric polymers include ethoxytriethyleneglycol methacrylate, 2-ethoxyethyl acrylate, 2-methoxyethyl acrylate and butadiene. The A block is comprised of a non-elastomeric hydrophobic polymer having a Tg>10° C., preferably 50–100° C., and a degree of polymerization <20, preferably <10, and more preferably <5. Suitable A block polymers include alkyl, aryl, and alkyl aryl acrylates or methacrylates having 1–12 carbon atoms in the alkyl group and/or 6–12 carbons in the aryl group such as methyl, ethyl, butyl, propyl, isobutyl, hexyl 2-ethyl hexyl, nonyl, lauryl, isobornyl, benzyl acrylates and methacrylates and the like; polymerizable vinyl aromatic monomers such as styrene, alpha methyl styrene, vinyl toluene and the like. The polymer, preferably the B block, must contain at least 2% of a polymerized moiety that renders the polymer water soluble upon neutralization with the appropriate reagents. Suitable monomers for rendering water solubility include acrylic acid, methacrylic acid, acrylamidomethylpropane sulfonic acid and benzene sulfonic acid. Suitable reagents to neutralize the acids include ammonia, aminopropanol, triethylamine, potassium hydroxide, sodium hydroxide, etc. Other suitable monomers for rendering water solubility include amine-containing monomers such as 2-dimethylaminoethyl methacrylate, 2-dimethylaminoethyl acrylate, 2-diethylaminoethyl methacrylate, and 2-diethylaminoethyl acrylate. Suitable reagents to neutralize the amine include inorganic and organic acid such as hydrochloric acid, paratoluenesulfonic acid, nitric acid, citric acid, and the like. Alternatively, the amine functionalities can be rendered water-soluble by quaternization with reagents such as benzyl chloride, dimethylsulfate, methyl chloride, etc.

Anionic Polymers

These polymers can be either random or block polymers. The polymer additive must be contain 3–70% by weight, preferably 10 to 40% of a water-soluble, polymerized acid monomer. Suitable acid monomers include acrylic acid, methacrylic acid, acrylamidomethylpropane sulfonic acid and benzene sulfonic acid. Suitable reagents to neutralize the acids to impart water-solubility include ammonia, aminopropanol, triethylamine, potassium hydroxide, sodium hydroxide, etc. The remainder of the polymer may be other ethylenically polymerizable monomers such as alkyl, aryl, and alkyl aryl acrylates or methacrylates having 1–12 carbon atoms in the alkyl group and/or 6–12 carbons in the aryl group such as methyl, ethyl, butyl, propyl, isobutyl, hexyl 2-ethyl hexyl, nonyl, lauryl, isobornyl, benzyl acrylates and methacrylates and the like; polymerizable vinyl aromatic monomers such as styrene, alpha methyl styrene, vinyl toluene, and the like; vinyl pyrrolidone, acrylamides, methacrylamides and mixtures of any of the above monomers. Some suitable anionic polymers include neutralized benzyl methacrylate//methacrylic acid 90//10, benzyl methacrylate/methacrylic acid 90/10, 80/20, 60/40, n-butyl methacrylate//methacrylic acid 85//15, and n-butyl methacrylate/methacrylic acid 90/10, 85/15, 70/30 and 60/40.

Cationic Polymers

These polymers can be either random or block polymers. The polymer additive must be contain 3–100% by weight, preferably 10 to 40% of a water-soluble, polymerized, neutralized or quaternized amine-containing monomer. Suitable amine-containing monomers such as 2-dimethylaminoethyl methacrylate, 2-dimethylaminoethyl acrylate, 2-diethylaminoethyl methacrylate, and 2-diethylaminoethyl acrylate. Suitable reagents to neutralize the amine include inorganic and organic acid such as hydrochloric acid, paratoluenesulfonic acid, nitric acid, citric acid, and the like. Alternatively, the amine functionalities can be rendered water-soluble by quaternization with reagents such as benzyl chloride, dimethylsulfate, methyl chloride, etc. The remainder of the polymer may be other ethylenically polymerizable monomers such as alkyl, aryl, and alkyl aryl acrylates or methacrylates having 1–12 carbon atoms in the alkyl group and/or 6–12 carbons in the aryl group such as methyl, ethyl, butyl, propyl, isobutyl, hexyl 2-ethyl hexyl, nonyl, lauryl, isobornyl, benzyl acrylates and methacrylates and the like; polymerizable vinyl aromatic monomers such as styrene, alpha methyl styrene, vinyl toluene, and the like; vinyl pyrrolidone, acrylamides, methacrylamides and mixtures of any of the above monomers. Some suitable cationic polymers include neutralized benzyl methacrylate//2-dimethylaminoethyl methacrylate 90//10, n-butyl methacrylate/2-dimethylaminoethyl methacrylate 90/10, 80/20, and 2-dimethylaminoethyl methacrylate homopolymer.

β-diketone Containing Polymers

The polymer additive must contain 5–40% by weight of a polymerized beta-diketone, most preferably, acetoacetoxy ethyl methacrylate. The polymer additive must contain 5–50% by weight of a polymerized moiety that renders the polymer water soluble upon neutralization with the appropriate reagents. Suitable monomers for rendering water solubility includes acrylic acid, methacrylic acid, acrylamido-methylpropane sulfonic acid and benzene sulfonic acid. Suitable reagents to neutralize these acids include ammonia, aminopropanol, triethylamine, potassium hydroxide, sodium hydroxide, etc. Other suitable monomers for rendering water solubility includes amine-containing monomers including 2-dimethylaminoethyl methacrylate, 2-dimethylaminoethyl acrylate, diethylaminoethyl methacrylate, 2-diethylaminoethyl acrylate. Suitable reagents to neutralize the amine include phosphoric acids, hydrochloric acids, paratoluenesulfonic acids, nitric acid and the like. Alternatively, the amine functionalities can be rendered water-soluble by quaternarization with reagents such as benzyl chloride, dimethylsulfate, methyl chloride etc. The remaining 10–90% by weight of the polymer can be other ethylenically polymerizable monomers such as alkyl acrylates or methacrylates having 1–12 carbon atoms in the alkyl group such as methyl, ethyl, butyl, propyl, isobutyl, hexyl, 2-ethyl hexyl, nonyl, lauryl, isobornyl acrylates and methacrylates, and the like; polymerizable vinyl aromatic monomers such as styrene, alpha methyl styrene, vinyl toluene and the like; vinyl pyrrolidone, acrylamides, methacrylamides and mixtures of any of the above monomers.

Examples of suitable β-diketone containing polymers include:

(1) an acrylic polymer comprising about 70–80% by weight of butyl methacrylate, 10–20% by weight of acetoacetoxy ethyl methacrylate and 10% by weight of acrylic acid. The acrylic polymer may have a glass transition temperature of about 15° C.;

(2) an acrylic polymer comprising about 5% by weight of butyl acrylate, 65% by weight of butyl methacrylate, 20% by weight of acetoacetoxy ethyl methacrylate and 10% by weight of acrylic acid. The acrylic polymer may have a glass transition temperature of about 10° C.;

(3) an acrylic polymer comprising about 10–40% by weight of methyl methacrylate, 30–60% by weight of butyl methacrylate, 20% by weight of acetoacetoxy ethyl methacrylate and 10% by weight of acrylic acid. The acrylic polymers may have a glass transition temperature of about 21–43° C.;

(4) acrylic polymer comprising about 10% by weight of methyl methacrylatc, 5% butyl acrylate, 55% by weight of butyl methacrylate, 20% by weight of acetoacetoxy ethyl methacrylate and 10% by weight of acrylic acid. The acrylic polymers may have a glass transition temperature of 16° C.

Ethylene Oxide Containing Polymers

Suitable ethylene oxide containing polymers are prepared from monomers having oligoether moieties of the general formula:

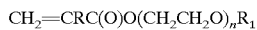

$$CH_2=CRC(O)O(CH_2CH_2O)_nR_1$$

wherein R=H or methyl; R1=alkyl of 1 to 4 carbon atoms, aryl of 6 to 12 carbon atoms, or alkyl-aryl, and n=1 to 20. Depending on the number, n, of oxyethylene units in the monomer the polymer can be slightly or completely water soluble. The solubility of the polymer increases as the number of oxyethylene units increases. The monomer having oligoether moieties can be advantageously used to adjust the physical properties, such as Tg, of the polymer additives of this invention, resulting in improved adhesion and waterfastness to the printed image, while maintaining the compatibility with an aqueous dispersion system. Some examples of these monomers include ethoxyethyl methacrylate, butoxyethyl methacrylate, ethoxytriethylene methacrylate, methoxypolyethylene glycol methacrylate, and 2-ethoxytriethylene glycol methacrylate. The ethylene oxide polymers may also contain an acidic or basic polymerized moiety that renders the polymer water soluble upon neutralization with the appropriate reagents. Suitable monomers for rendering water solubility include acrylic acid, methacrylic acid, acrylamidomethylpropane sulfonic acid and benzene sulfonic acid. Suitable reagents to neutralize the acids include ammonia, aminopropanol, triethylamine, potassium hydroxide, sodium hydroxide, etc. Other suitable monomers for rendering water solubility include aminecontaining monomers such as 2-dimethylaminoethyl methacrylate, 2-dimethylaminoethyl acrylate, 2-diethylaminoethyl methacrylate, and 2-diethylaminoethyl acrylate. Suitable reagents to neutralize the amine include inorganic and organic acid such as hydrochloric acid, paratoluenesulfonic acid, nitric acid, citric acid, and the like. Alternatively, the amine functionalities can be rendered water-soluble by quaternization with reagents such as benzyl chloride, dimethylsulfate, methyl chloride, etc. The ethylene oxide containing polymers may also contain other ethylenically polymerizable monomers such as alkyl, aryl, and alkyl aryl acrylates or methacrylates having 1–12 carbon atoms in the alkyl group and/or 6–12 carbons in the aryl group such as methyl, ethyl, butyl, propyl, isobutyl, hexyl 2-ethyl hexyl, nonyl, lauryl, isobornyl, benzyl acrylates and methacrylates and the like; polymerizable vinyl aromatic monomers such as styrene, alpha methyl styrene, vinyl toluene, and the like; vinyl pyrrolidone, acrylamides, methacrylamides and mixtures of any of the above monomers. Some examples of suitable ethylene oxide containing polymer additives include neutralized 2-ethoxytriethylenglycol methacrylate/benzyl methacrylate/methacrylic acid 30/60/10 weight percent, 2-ethoxytriethylene glycol methacrylate/benzyl methacrylate/2-dimethylaminoethyl methacrylate 50/40/10 weight percent.

Other Ingredients

The ink may contain other ingredients. For example, surfactants may be used to alter surface tension as well as maximize penetration of the ink into the print media. However, surfactants may destabilize the colorant dispersion. In addition, the choice of a specific surfactant is highly dependent on the type of media substrate to be printed. In aqueous inks, the surfactants may be present in the amount of 0.01 to 5% and preferably 0.2 to 2%, based on the total weight of the ink.

Biocides, such as Dowicides® (Dow Chemical, Midland, Mich.), Nuosept® (Huls America, Inc., Piscataway, N.J.), Omidinesg (Olin Corp., Cheshire, Conn.), Nopcocides(® (Henkel Corp., Ambler, Pa.), Troysans® (Troy Chemical Corp., Newark, N.J.) and sodium benzoate may be used in the ink compositions to inhibit growth of microorganisms. Sequestering agents such as EDTA may also be included to eliminate deleterious effects of heavy metal impurities. Other known additives, such as humectants, viscosity modifiers and the like made also be added to improve various properties of the ink compositions.

Ink Preparation and Properties

The inks are prepared by premixing the selected colorant(s) and dispersant and then dispersing or deflocculating the mixture. The dispersing step may be accomplished in a horizontal mini mill, a ball mill, an attritor, a roll mill such as a 2 roll or 3 roll mill, or by passing the mixture through a plurality of nozzles within a liquid jet interaction chamber at a liquid pressure of at least 5000 psi to produce a uniform dispersion in the aqueous carrier medium.

It is generally desirable to make these ink jet inks in concentrated form. The concentrated ink jet inks are subsequently diluted to the appropriate concentration for use in the ink jet printing system. This technique permits preparation of a greater quantity of ink from the equipment. Prior to use, the concentrate is then diluted to the desired concentration with appropriate solvents which contain the water soluble binder additive. By dilution, the ink is adjusted to the desired viscosity, color, hue, saturation density, and print area coverage for the particular application.

Jet velocity, separation length of the droplets, drop size, and stream stability are greatly affected by the surface tension and the viscosity of the ink. Ink jet inks suitable for use with ink jet printing systems should have a surface tension in the range of about 20 dyne/cm to about 70 dyne/cm and, more preferably, in the range 30 dyne/cm to about 70 dyne/cm. Acceptable viscosities are no greater than 20 cP, and preferably in the range of about 1.0 cP to about 10.0 cP. The ink has physical properties compatible with a wide range of ejecting conditions, i.e., driving voltage and pulse width for thermal ink jet printing devices, driving frequency of the piezo element for either a drop-on-demand device or a continuous device, and the shape and size of the nozzle. They may be used with a variety of ink jet printers such as continuous, piezoelectric drop-on-demand and thermal or bubble jet drop-on-demand, and are particularly adapted for use in thermal ink jet printers. The inks have excellent storage stability for a long period and do not clog in an ink jet apparatus. Fixing the ink on the image recording material, such as, paper, fabric, film, etc., can be carried out rapidly and accurately. The printed ink images have clear color tones, high density, excellent water resistance and lightfastness. Furthermore, the ink does not corrode parts of the ink jet printing device it comes in contact with.

EXAMPLES

The invention will now be further illustrated by, but not limited to, the following examples, in which parts and percentages are by weight unless otherwise noted.

Linear Polymer 1:

A 1-liter flask was equipped with a mechanical stirrer, thermometer, N2 inlet, drying tube outlet, and addition funnels. Tetrahydrofuran (THF), 188 g, and mesitylene, 0.1 g, were charged to the flask. The catalyst tetrabutyl ammonium m-chlorobenzoate, 230 µl of a 1.0 M solution in THF, was then added. Initiator, 1-methoxy-1-trimethylsiloxy-2-methyl propene, 5.0 g (0.0287 mol), was injected. Feed I [tetrabutyl ammonium m-chlorobenzoate, 230 μl of a 1.0 M solution in THF] was started and added over 130 minutes. Feed II [benzyl methacrylate (BZMA), 25.29 g (0.144 mol)] was started at 0.0 minutes and added over 30 minutes. Ten minutes after Feed II was completed (over 99% of the the monomer had reacted), Feed III [trimethylsilylmcthacrylic acid (TMS-MAA), 13.62 g (0.0862 mol) and ethoxytriethyleneglycol methacrylate(ETEGMA), 212.07 g (0. 862 mol)], was started and added over 60 minutes. One hour after Feed III was completed (over 99% monomers had reacted), Feed IV [benzyl methacrylate, 25.29 g (0.144 mol)] was started and added over 30 minutes. At 150 minutes, 7 g of methanol were added. Then 223 g of solvents and trimethylmethoxysilane were stripped out and replaced with 274 g isopropanol.

This made a BZMA//ETEGMA/MAA//BZMA 5//30/3//5 polymer at 48% solids. The polymer was neutralized to 80% by adding 2.5 grams of 70% aqueous potassium hydroxide solution to 250 grams of the block copolymer solution and mixing until a homogeneous solution was obtained. After neutralization the material was diluted with 353.7 grams of deionized water. The pH was 7.5.

Linear Polymer 2:

A BZMA/MAA 90/10 (weight %) polymer was prepared using same procedure as Polymer Preparation 1 with the following exceptions: In the pot, the amounts of THF, mesitylene and tetrabutylammonium m-chlorobenzoate used were 730.60 g, 1.70 g and 1.0 g, respectively. Instead of 1-methoxy-1-trimethylsiloxy-2-methyl propene, 5.0 g, 1,1-bis(trimethylsiloxy)-2-methyl propene, 38.09 g was used as the initiator. Feed I contained 1.63 g tetrabuty m-chlorobenzoate and 64.73 g THF, respectively. Feed II contained BZMA, 724.46 g and TMS-MAA 148.44 g. There was no Feed III or Feed IV. The amount of methanol added to quench the reaction was 362 g total. After the reaction, a total of 943 g solvents and trimethylmethoxysilane were distilled off and 725.65 g 2-pyrrolidone were added to yield a 49.6% solids solution. 242 grams of polymer solution were neutralized with 2.5 grams of KOH solution. After neutralization the material was reduced to approximately 10% solids with 361 grams of deionized water. The pH was 7.5

Linear Polymer 3:

A 12 liter flask was equipped with a mechanical stirrer, nitrogen inlet, drying tube outlet and addition funnels. THF, 2886.9 g; mesitylene, 3.7244 g; and tetrabutylammonium m-chlorobenzoate, 1.2 mL of a 1.0 M THF solution were charged to the pot. Initiator, 1-methoxy-1-trimethylsiloxy-2-methylpropene, 47.3 g was injected. Feed I (BMA, 2307.1 g and DMAEMA, 576.8 g) was added. After 170 min. the reaction was quenched with 63.9 g of methanol. Volatiles were distilled off, 1315.7 g, and 1250.7 g of isopropanol was added. The polymer solution was then charged to a separate 1-liter flask was equipped with a mechanical stirrer and addition funnels. Concentrated phosphoric acid, and deionized water were charged to the pot and contents brought to reflux. Volatiles were distilled off until the vapor temperature exceeds 99° C. This made the phosphate salt of BMA/DMAEMA 80/20 polymer with molecular weight of around 10,000 at about 20.3% solids in water.

Linear Polymer 4:

A 12-liter flask was equipped with a mechanical stirrer, nitrogen inlet, drying tube outlet and addition funnels. THF, 1700 g; p-xylene, 18 g; and tetrabutylammonium m-chlorobenzoate, 2.6 mL of a 1.0 M THF solution were charged to the pot. Initiator, 1-methoxy-1-trimethylsiloxy-2-methylpropene, 150 g, was injected. Feed 1 (ETEGMA, 3448 g and DMAEMA, 862 g) was started and added over 60 min. After another 30 min. all of the monomers were consumed. The reaction was quenched with methanol, 69 g. Concentrated phosphoric acid, 561 mL, and deionized water, 3736 g, were charged, in batches, to the pot. At the same time, the contents were brought to reflux and volatiles were distilled off until the vapor temperature exceeds 99° C. This made the phosphate salt of ETEGMA/DMAEMA random copolymer with molecular weight of around 5,000 at about 57% solids in water.

Linear Polymer 5:

A 3-liter flask was equipped with a mechanical stirrer, nitrogen inlet, drying tube outlet and addition funnels. THF, 345 g; p-xylene, 1 g, and tetrabutylammonium m-chlorobenzoate, 0.4 mL of a 1.0 M THF solution, were charged to the pot. Initiator, 1-methoxy-1-trimethylsiloxy-2-methylpropene, 15 g, was injected. Feed 1 (BMA, 388 g and DMAEMA, 43 g) was started and added over 60 min. After another 60 min. all of the monomers were consumed. The reaction was quenched with methanol, 14 g. Benzyl chloride, 31 g; was added to the polymer solution and brought to reflux. After 10 hours, 1600 g of deionized water were added. The reaction mixture was refluxed for another 4 hours. Volatiles were distilled off until the vapor temperature exceeded 97° C. This made the benzyl chloride (BzCl) salt of BMA random copolymer with molecular weight of around 5,000 at about 20% solids in water.

Linear Polymer 6:

A 2-liter flask was equipped with a mechanical stirrer, nitrogen inlet, drying tube outlet and addition funnels. THF, 225 g; p-xylene, 10 g; and tetrabutylammonium m-chlorobenzoate (TBACB), 0.20 mL of a 1.0 M THF solution were charged to the pot. Initiator, 1-methoxy-1-trimethylsiloxy-2-methylpropene, 3.5 g, was injected. Feed 1 (DMAEMA , 200 g) was started and added over 20 min. Feed 2 (TBACB, 0.20 mL; THF, 75 g) was started at the same time and added over 30 min. After another 30 min. no residual monomer was detected. The reaction was quenched with methanol, 10 g, resulting in a DMAEMA homopolymer at about 44% solids in THF. 112.6 grams of the DMAEMA solution was charged to a separate 1-liter flask equipped with a mechanical stirrer and addition funnels. Concentrated phosphoric acid, 32.77 mL; and deionized water, 220 g, were added and contents brought to reflux. Volatiles were distilled off until the vapor temperature exceeds 99° C. This made the phosphate salt of DMAEMA polymer with molecular weight of around 10,000 at about 32% solids in water.

Linear Polymer 7:

A 5-liter flask was equipped with a mechanical stirrer, nitrogen inlet, drying tube outlet and addition funnels. THF, 850 g; p-xylene, 4 g; and tetrabutylammonium m-chlorobenzoate, 0.9 mL of a 1.0 M THF solution, were charged to the pot. Initiator, 1-methoxy-1-trimethylsiloxy-2-methylpropene, 31 g was injected. Feed 1 (BZMA, 356 g; ETEGMA, 445 g; and DMAEMA, 89 g) was started and added over 100 min. After another 80 min. no residual monomer was detected. The reaction was quenched with methanol, 57 g. 200 grams of the resulting solution (about 51% solids in THF) of BzMA/ETEGMA/DMAEMA terpolymer (wt. ratio 40/50/10) with molecular weight of around 5,000 was added to a separate 1-liter flask equipped with a mechanical stirrer and addition funnels. Concentrated phosphoric acid, 6.7 mL; and deionized water, 143 g were charged to the pot and contents brought to reflux. Volatiles were distilled off until the vapor temperature exceeded 99°

C. This made the phosphate salt of BzMA/ETEGMA/DMAEMA terpolymer at about 40% solids in water.

Linear Polymer 8:

A 3-liter flask was equipped with a mechanical stirrer, nitrogen inlet, drying tube outlet and addition funnels. THF, 370 g; p-xylene, 1.1 g; and tetrabutylammonium m-chlorobenzoate (TBACB), 0.43 mL of a 1.0 M THF solution were charged to the pot. Initiator, 1-methoxy-1-trimethylsiloxy-2-methylpropene, 15 g was injected. Feed 1 (BMA, 345 g; and DMAEMA, 86 g) was started and added over 60 min. Feed 2 (TBACB, 0.43 mL; THF, 20 g) was started at the same time and added over 120 min. After another 40 min. no residual monomer was detected. The reaction was quenched with methanol, 14 g. 95 grams of the BMA/DMAEMA polymer solution (about 52% solids in THF) was charged to a separate 1-liter flask equipped with a mechanical stirrer and addition funnels. Concentrated phosphoric acid, 3.6 mL; and deionized water, 203 g were charged to the pot and contents brought to reflux. Volatiles were distilled off until the vapor temperature exceeds 99° C. This made the phosphate salt of BMA/DMAEMA copolymer (wt. ratio 80/20) with molecular weight of around 5,000 at about 15% solids in water.

Linear Polymer 9:

A reactor was equipped with a mechanical stirrer, thermometer and addition funnels. Ethyl acetate, 140 g, was charged to the pot and brought to reflux. Feed 1 (n-butyl methacrylate, 140 g; 2-(acetoacetoxy)ethyl methacrylate, 40 g; and acrylic acid, 20 g) was then started and added over 180 min. Feed 2 (2,2'-azobis(2,4-dimethylvaleronitrile), 20.00 g; ethyl acetate, 50 g) was started at the same time as Feed 1 and added over 300 min. The mixture was refluxed for an additional 30 min. and 2-Pyrrolidone, 260 g, was added. Volatiles, 230 g, were removed through distillation. The polymer was inverted into water by addition of 50 g of aqueous potassium hydroxide solution (45.7% concentration) and 510 g of deionized water. The resultant polymer has a weight average molecular weight of 24,800 and number average molecular weight of 10,500 and polydispersity of 2.

Dispersant 1:

A 1-liter flask was equipped with a mechanical stirrer, thermometer, N2 inlet, drying tube outlet, and addition funnels. Tetrahydrofuran (THF), 83 g, and mesitylene, 0.1 g, were charged to the flask. The catalyst tetrabutyl ammonium m-chlorobenzoate, 230 µl of a 1.0 M solution in THF, was then added. Initiator, 1,1-bis(trimethylsiloxy)-2-methyl propene, 5.0 g (0.020 mol), was injected. Feed I [tetrabutyl ammonium m-chlorobenzoate, 230 µl of a 1.0 M solution in THF] was started and added over 130 minutes. Feed II [trimethylsilyl methacrylic acid, 40.86 g (0.250 mol)] was started at 0.0 minutes and added over 30 minutes. Thirty minutes after Feed II was completed (over 99% of the the monomer had reacted), Feed II [benzyl methacrylate, 56.90 g (0.323 mol)], was started and added over 60 minutes. Ten minutes after Feed III was completed (over 99% monomers had reacted), Feed IV [ethoxytriethylene glycol methacrylate, 21.21 g (0.0862 mol)] was started and added over 30 minutes At 150 minutes, 12 g of methanol were added. Then 98 g of solvents and trimethylmethoxysilane were stripped out and replaced with 153 g 2-pyrrolidone.

This made a ETEGMA//BZMA//MAA 4//15//12 polymer at 40% solids. The block polymer was neutralized to 80% by adding 11 grams of 45% aqueous potassium hydroxide solution to 100 grams of the block copolymer solution and mixing until a homogeneous solution was obtained. After neutralization the material was reduced to approximately 10% solids with 289 grams of deionized water. The pH was 8.

Dispersant 2:

A 12-liter flask was equipped with a mechanical stirrer, thermometer, N2 inlet, drying tube outlet, and addition funnels. Tetrahydrofuran THF, 4002 gm, and p-xylene, 7.7 gm, were charged to the flask. The catalyst, tetrabutyl ammonium m-chlorobenzoate, 2.0 ml of a 1.0 M solution in acetonitrile, was then added. Initiator, 1-methoxy-1-trimethylsiloxy-2-methyl propene, 155.1 gm (0.891 M) was injected. Feed I [2-dimethylaminoethyl methacrylate DMAEMA, 2801 gm (17.8 M)] was started at 0.0 minutes and added over 45 minutes. One hundred minutes after Feed I was completed (over 99% of the monomers had reacted), Feed II [benzyl methacrylate, 1568 gm (8.91 M) was started and added over 30 minutes. At 400 minutes, 310 gm of dry methanol were added to the above solution and distillation begun. A total of 1725 gm of solvent were removed. I-propanol, 1783 gm, was added after completion of the distillation.

This made a BZMA//DMAEMA 10//20 diblock polymer at 49.6% solids and a Mn=5000.

Pigment Dispersion 1:

A 1-liter beaker was equipped with a mechanical stirrer. Into the beaker was placed 94 g of Dispersant 1 and 13 g water. With stirring, 18.7 g FW 18 black pigment (Degussa Corp., Ridgefield Park, N.J.) were added in small portions. When the mixture was thoroughly combined, it was passed through a model M-1/110 oF Microfluidizer (Microfluidics Corp., Newton, Mass.) five times. The particle size after microfluidization was 108 nm; and pigment concentration of the dispersion was 15%.

| Pigment Dispersion 2: | |
|---|---|
| Ingredient | Amount (gm) |
| Dispersant 2 | 214.6 |
| Quinacridone magenta pigment(R-122, Sun Chemical Corp, Cincinnati, OH.) | 180.0 |

The above ingredients were mixed and the mixture was then charged to a 2 roll mill and processed for 30 minutes. This made a pigment dispersion that contained 60% pigment and 40% polymer (i.e., it had a pigment-to-dispersant ratio ("P/D") of 1.5/1). The 2 roll mill chip, 80 gm, was then dissolved using 13.14 gm phosphoric acid as the neutralizing agent and then diluted with 307 gm of deionized water to make an aqueous pigment concentrate that contained 10% pigment.

| Pigment Dispersion 3: | |
|---|---|
| Ingredient | Amount (gm) |
| Dispersant 2 | 493.0 |
| Diarylide yellow pigment (Y14, Sun Chemical Corp., Cincinnati, OH.) | 250.0 |

The above mixture was charged to a 2 roll mill and processed for 30 minutes. This made a pigment dispersion that contained 50% pigment and 50% polymer (P/D=1/1). The 2 roll mill chip was then neutralized and diluted as in Pigment Dispersion 2.

Control 1:

An ink was prepared by combining the following ingredients with magnetic stirring over 10–15 minutes:

| Ingredient | Amount (gms) |
| --- | --- |
| Pigment Dispersion 1 | 26.7 |
| 2-pyrrolidone | 6 |
| Liponics ® EG-1, Lipo Chemical Co., Paterson, NJ | 8 |
| Deionized water | 62.3 |

The ink was jetted out of a Hewlett Packard DeskJet Printer (Hewlett Packard, Palo Alto, Calif.) in a pattern of seven parallel ⅛ inch solid black lines, spaced ⅛ inch apart. Image quality and pen performance were excellent. The images were left 24 hours and then marked with a commercial yellow highlighter pen. Black smear onto the non-imaged portions of the paper was severe (10 on a scale of 0–10, where 0 is no smear and 10 is severe smear).

Example 1:

An ink was prepared by combining the following ingredients with magnetic stirring over 10–15 minutes:

| Ingredient | Amount (gms) |
| --- | --- |
| Pigment Dispersion 1 | 26.7 |
| 2-pyrrolidone | 6 |
| Liponics ® EG-1 | 8 |
| Polymer 1 | 10 |
| Deionized water | 52.3 |

The ink was imaged and marked with a highlighter as described in Control 1. Image quality and pen performance were excellent. After highlighting smear was considerably less than the control (5 on a scale of 1–10).

Example 2:

An ink was made and tested as described in Example 1 with the following exception: Instead of 10 g of Polymer 1, 10 g solution from Polymer 2 were used. The ink was imaged and marked with a highlighter as described in Control 1. Image quality and pen performance were good. After highlighting smear was considerably less than the control (5 on a scale of 1–10).

Control 2:

A magenta ink with the following formula was prepared:

| Ingredient | Amount (gm) |
| --- | --- |
| Pigment Dispersion 2 | 7.5 |
| 2-ethyl-2(hydroxymethyl)-1,3-propanediol (50% aqueous solution) | 6 |
| Multranol ® 4012 (30% aqueous solution) | 4 |
| Sodium salt, AR52 red dye (3.78%) | 4 |
| Deionized water | 8.5 |

Example 3:

A magenta ink was prepared as for Control 2 above with the exception that 1.5 g of Linear Polymer 3 were added to the ink instead of the equivalent weight of water.

The inks were printed using a Hewlett-Packard Deskjet 500 printer printing onto Gilbert Bond paper (25% cotton, Mead Co. Dayton, Ohio). The ink jet pens were modified to have a resistor size of 35 microns and an orifice of 30 microns. An external voltage of 12.5 volts was used to fire the pens.

Blockage time was measured by printing a series of lines, waiting a specified period of time, and then printing the series of lines again. The maximum time after which no printing defects were observed in the first, fifth, and thirty-first line printed was recorded. Printing defects include missing and mis-aligned dots. A longer time indicates slower or less nozzle pluggage. Waterfastness of the printed images was measured by printing a series of lines ¼ inch wide. Five milliliters of water were dripped across the line and the optical density of the washoff with the drip was measured. Waterfastness was measured five minutes, one hour, and 24 hours after printing. Results are given in Table 1 below.

TABLE 1

| Sample | Blockage Time (sec) | | | Waterfastness (mOD) | | |
| --- | --- | --- | --- | --- | --- | --- |
| | 1st line | 5th line | 31st line | @ 5 min. | @ 1 hr. | @ 24 hr. |
| Control 2 | 10 | 20 | 70 | 305 | 298 | 192 |
| Example 3 | <10 | 20 | 220 | 128 | 119 | 27 |

Improvement was seen in both nozzle pluggage time and waterfastness.

Control 3:

An ink was prepared by combining the following ingredients with adequate mixing:

| Ingredient | Amount (gms) |
| --- | --- |
| Pigment Dispersion 2 | 6.1 |
| Acid Red 52 | 0.1 |
| Tetraethylene Glycol | 1.0 |
| Danthacol ® DHE, Lonza, Inc., Fairlawn, NJ | 1.0 |
| Multranol ® 4012 | 0.6 |
| 2-Pyrrolidone | 1.2 |
| Deionized water | 10.0 |

The ink was printed on of a Hewlett-Packard DeskJet Printer (Hewlett Packard, Palo Alto, Calif.). Chroma of the printed image was measured on Minolta Chroma Meter CR221. The average Chroma was 62.

Example 4:

An ink was prepared by combining the following ingredients with adequate mixing:

| Ingredient | Amount (gms) |
| --- | --- |
| Linear Polymer 4 | 0.7 |
| Pigment Dispersion 2 | 6.1 |
| Acid Red 52 | 0.1 |
| Tetraethylene Glycol | 1.0 |
| Danthacol ® DHE | 1.0 |
| Multranol ® 4012 | 0.6 |
| 2-Pyrrolidone | 1.2 |
| Deionized water | 9.3 |

The ink was printed as described in Control 3. Chroma of the printed image was measured on Minolta Chroma Meter CR221. The average Chroma was 66. Addition of linear polymer 4 enhanced chroma over control ink 3.

Control 4:

An ink was prepared by combining the following ingredients with adequate mixing:

| Ingredient | Amount (gms) |
| --- | --- |
| Pigment Dispersion 3 | 7.5 |
| 2-Ethyl-2-Hydroxymethyl-1,3-propanediol | 5.0 |
| 2-neo-Pentyl Alcohol | 0.5 |
| Deionized water | 12.0 |

The ink was printed as described in Control 3. Chroma of the printed image was measured on Minolta Chroma Meter CR221. The average Chroma was 92.

Example 5:

An ink was prepared by combining the following ingredients with adequate mixing:

| Ingredient | Amount (gms) |
| --- | --- |
| Linear Polymer 6 | 2.5 |
| Pigment Dispersion 3 | 7.5 |
| 2-Ethyl-2-Hydroxymethyl-1,3-propanediol | 5.0 |
| 2-neo-pentyl alcohol | 0.5 |
| Deionized water | 9.5 |

The ink was printed as described in Control 3. Chroma of the printed image was measured on Minolta Chroma Meter CR22 1. The average Chroma was 98. Addition of linear polymer enhanced the chroma over control ink 4.

Control 5:

An ink was prepared by combining the following ingredients with adequate mixing:

| Ingredient | Amount (gms) |
| --- | --- |
| Pigment Dispersion 2 | 2.3 |
| Pigment Dispersion 3 | 2.3 |
| 2-Ethyl-2-Hydroxymethyl-1,3-propanediol | 2.0 |
| Multranol ® 4012 | 0.6 |
| 2-Pyrrolidone | 1.0 |
| Deionized water | 10.9 |

The ink was printed on of a Hewlett-Packard DeskJet Printer (Hewlett Packard, Palo Alto, Calif.). For Haze measurement, solid 70 cm×70 cm square images were printed on Xerox transparencies. Haze measurements were made on a Hunterlab ColorQuest instrument (Hunter Associates Laboratory Inc., Reston, Va.). The average haze value was 17.

The inks were also tested for waterfastness by printing a pattern of parallel solid lines of 3 mm line thickness, spaced 5 mm apart on Gilbert Bond paper. The printed sheet was supported on a firm surface and inclined at a 45° angle with the lines running horizontally. Water, about 0.5 mL, was allowed to drip down these lines. The amount of ink washed out onto the unprinted areas was: 130 mOD immediately after printing, 146 mOD at 1 hour after printing, and 123 mOD at 24 hours after printing.

Example 6:

An ink was prepared by combining the following ingredients with adequate mixing:

| Ingredient | Amount (gms) |
| --- | --- |
| Linear Polymer 6 | 1.9 |
| Pigment Dispersion 2 | 2.3 |
| Pigment Dispersion 3 | 2.3 |
| 2-Ethyl-2-Hydroxymethyl-1,3-propanediol | 2.0 |
| Multranol ® 4012 | 0.6 |
| 2-Pyrrolidone | 1.0 |
| Deionized water | 9.3 |

The ink was printed and subjected to a waterfastness test as described in Control 5. Haze measurements were measured as described in Control 5. The average haze value of this ink was 13. The amount of ink washed out onto the unprinted areas was: 122 mOD immediately after printing, 117 mOD at 1 hour after printing, and 91 mOD at 24 hours after printing. Haze is reduced and waterfastness is improved over control ink 5 which does not contain linear polymer additive.

Example 7:

An ink was prepared by combining the following ingredients with adequate mixing:

| Ingredient | Amount (gms) |
| --- | --- |
| Linear Polymer 7 | 3.5 |
| Pigment Dispersion 2 | 2.3 |
| Pigment Dispersion 3 | 2.3 |
| 2-Ethyl-2-Hydroxymethyl-1,3-propanediol | 2.0 |
| Multranol ® 4012 | 0.6 |
| 2-Pyrrolidone | 1.0 |
| Deionized water | 7.8 |

The ink was printed and tested for waterfastness as described in Control 5. Haze measurements were measured as described in Control 5. The average haze value of this ink was 6. The amount of ink washed out onto the unprinted areas was: 120 mOD immediately after printing, 105 mOD at 1 hour after printing, and 89 mOD at 24 hours after printing. Haze is reduced and waterfastness improved over control ink 5.

Example 8:

An ink was prepared by combining the following ingredients with adequate mixing:

| Ingredient | Amount (gms) |
| --- | --- |
| Linear Polymer 8 | 2.8 |
| Pigment Dispersion 1 | 2.25 |
| Pigment Dispersion 2 | 2.25 |
| 2-Ethyl-2-Hydroxymethyl-1,3-propanediol | 2.0 |
| Multranol ® 4012 | 0.6 |
| 2-Pyrrolidone | 1.0 |
| Deionized water | 7.8 |

The ink was printed and tested for waterfastness as described in Control 5. Haze measurements were measured as described in Control 5. The average haze value of this ink was 7. The amount of ink washed out onto the unprinted areas was: 28 mOD immediately after printing, 14 mOD at 1 hour after printing, and 4 mOD at 24 hour after printing. Haze is reduced and waterfastness improved over control ink 5.

Control 6:

An ink was prepared by combining the following ingredients with magnetic stirring over 10–15 minutes:

| Ingredient | Amount (gms) |
| --- | --- |
| Pigment Dispersion 1 | 19.0 |
| 2-Pyrrolidone | 3.0 |
| Liponics ® EG-1 | 4.5 |
| neopentyl alcohol | 0.2 |
| dodecanol | 0.1 |
| Deionized water | 49.0 |

The inks were jetted out of a Hewlett Packard DeskJet 550C Printer in a pattern of seven parallel ⅛ inch solid black lines, spaced ⅛ in apart. Pen performance was found to be excellent for this ink. The optical density of the images is shown in Table 2. The images were doubly-marked with a commercial yellow highlighter pen at specified time intervals after printing. The amount of ink smeared onto the unprinted areas under these conditions was determined by measuring the optical density of these areas. Results are shown in Table 2.

Example 10:

An ink was prepared by combining the ingredients as described in Control 6 except that 1.8 g of Linear Polymer 9 were added and the amount of deionized water was decreased by the same amount. Pen performance was found to be excellent for this ink. Results are shown in Table 2.

Example 11:

An ink was prepared by combining the ingredients as described in Control 6 except that 3.6 g of Linear Polymer 9 was added and the amount of deionized water was decreased by the same amount. Pen performance was found to be excellent for this ink. Results are shown in Table 2.

TABLE 2

| Sample | O D as printed | O D Of Smear | |
| --- | --- | --- | --- |
| | | 5 min. after print | 1 hr after print |
| Control 6 | 1.54 | 0.28 | 0.20 |
| Example 10 | 1.47 | 0.09 | 0.07 |
| Example 11 | 1.42 | 0.04 | 0.04 |

What is claimed is:

1. An ink jet ink comprising:
   (a) an aqueous carrier medium;
   (b) an aqueous carrier medium insoluble colorant
   (c) a polymer dispersant; and
   (d) a linear polymer additive selected from the group consisting of:
   (i) water soluble, elastomeric ABA block polymers wherein the B block comprises an elastomeric polymer having a Tg of <0° C. and a degree of polymerization of >10, and wherein the A block comprises a non-elastomeric acrylic or methacrylic polymer having a Tg >10° C. and a degree of polymerization of <20; and
   (ii) water-dispersible β-diketone polymers wherein the linear polymer additive is present in the amount of 0.5 to 20% by weight.

2. The ink composition of claim 1 wherein the linear polymer additive is a water soluble, elastomeric ABA block polymer wherein the B block comprises an elastomeric polymer having a Tg of <0° C. and a degree of polymerization of >10, and wherein the A block comprises a non-elastomeric acrylic or methacrylic polymer having a Tg >10° C. and a degree of polymerization of <20.

3. The ink composition of claim 2 wherein the B block has a Tg of −50 to −80° C. and a degree of polymerization of 20 to 40 and wherein the A block has a Tg of 50 to 100° C. and a degree of polymerization of 5–10.

4. The ink composition of claim 2 wherein the ABA block polymer is selected from the group consisting of
   (a) n-butyl methacrylate//methacrylic acid/2-ethoxytriethylene glycol methacrylate//n-butyl methacrylate (5//3/30//5);
   (b) benzyl methacrylate//methacrylic acid/2-ethoxytriethylene glycol methacrylate//benzyl methacrylate (5//3/30//5); and
   (c) n-butyl methacrylate//demthylaminoethyl methacrylate/2-ethoxytriethylene glycol methacrylate//n-butyl methacrylate (5//5/30//5).

5. The ink composition of claim 1 wherein the linear polymer additive comprises:
   (a) 55 to 80% by weight of an alkyl methacrylate or alkyl acrylate, wherein the alkyl has 1 to 12 carbon atoms, a polymerizable vinyl aromatic monomer, vinyl pyrrolidone or mixtures thereof,
   (b) 5 to 40% by weight of acetoacetoxy ethyl methacrylate or acrylate; and
   (c) 5 to 15% by weight of acrylic or methacrylic acid; wherein the acrylic polymer has a weight average molecular weight of 5000 to 30,000.

6. The ink composition of claim 1 wherein the linear polymer additive is present in the amount of 1 to 12% by weight, based on the total weight of the ink composition.

7. The ink composition of claim 1 wherein the ink composition comprises approximately 0.1 to 8% aqueous carrier medium insoluble colorant, 0.1 to 8% polymer dispersant, 70 to 99.8% aqueous carrier medium and 0.5 to 20% linear polymer additive, based upon the total weight of the ink composition.

* * * * *